(12) United States Patent
Imano et al.

(10) Patent No.: US 7,165,325 B2
(45) Date of Patent: Jan. 23, 2007

(54) WELDING MATERIAL, GAS TURBINE BLADE OR NOZZLE AND A METHOD OF REPAIRING A GAS TURBINE BLADE OR NOZZLE

(75) Inventors: Shinya Imano, Hitachi (JP); Hiroyuki Doi, Naka (JP); Kunihiro Ichikawa, Hitachinaka (JP); Hideaki Ishii, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 10/635,548

(22) Filed: Aug. 7, 2003

(65) Prior Publication Data
US 2004/0076540 A1    Apr. 22, 2004

(30) Foreign Application Priority Data
Oct. 16, 2002 (JP) ............... 2002-301549

(51) Int. Cl.
B23P 6/00 (2006.01)

(52) U.S. Cl. ............ 29/889.1; 228/119; 228/155; 148/428; 420/443; 420/445; 420/446; 420/447; 420/448; 420/449; 420/450; 420/451

(58) Field of Classification Search ............ None
See application file for complete search history.

(56) References Cited

U.S. PATENT DOCUMENTS

| | | | |
|---|---|---|---|
| 3,649,257 A | 3/1972 | Fletcher | |
| 3,677,747 A * | 7/1972 | Lund et al. | 420/448 |
| 3,785,877 A * | 1/1974 | Bailey | 148/556 |
| 3,859,060 A | 1/1975 | Eiselstein | |
| 3,890,816 A * | 6/1975 | Allen et al. | 75/255 |
| 4,039,330 A | 8/1977 | Shaw | |
| 4,108,648 A | 8/1978 | Zhurkina | |
| 5,370,497 A | 12/1994 | Doi et al. | |
| 5,938,863 A * | 8/1999 | Malley | 148/428 |

FOREIGN PATENT DOCUMENTS

| | | |
|---|---|---|
| EP | 0709477 | 5/1996 |
| EP | 1090711 | 4/2001 |
| JP | 46-1305 | 9/1971 |

(Continued)

OTHER PUBLICATIONS

Machine English Language Translation of Japanese Patent Publication 06-212325.*

*Primary Examiner*—John P. Sheehan
(74) *Attorney, Agent, or Firm*—Antonelli, Terry, Stout and Kraus, LLP.

(57) ABSTRACT

A welding material composition, which is a nickel based super alloy having γ' phase and chromium carbides precipitated. The composition comprising 18 to 25% by weight of Co, 15 to 20% by weight of Cr, 1.5 to 5.5% by weight of Al, 5 to 14% by weight of W, 0.05 to 0.15% by weight of C, 0 to 0.02% by weight of B, 0 to 1% by weight of at least one of Ta, Nb, Ti, Mo, Re and Fe, 0 to 0.5% by weight of at least one of V, Zr, rare earth elements and Y, 0 to 1% by weight of Mn, 0 to 0.5% by weight of Si, and the balance being Ni.

4 Claims, 5 Drawing Sheets

FOREIGN PATENT DOCUMENTS

| | | |
|---|---|---|
| JP | 48-4331 | 1/1973 |
| JP | 60-100641 | 6/1985 |
| JP | 61-113742 | 5/1986 |
| JP | 62-30037 | 2/1987 |
| JP | 06-212325 * | 2/1994 |
| JP | 2000-64005 | 2/2000 |
| JP | 2000-210789 | 8/2000 |

* cited by examiner

REPAIRED BLADE 1
AFTER OPERATION

INVENTION ALLOY 1

REPAIRED BLADE 2
AFTER OPERATION

INVENTION ALLOY 2

DEPOSIT WELDING
(INVENTION ALLOY 1)

WELDING MATERIAL, GAS TURBINE BLADE OR NOZZLE AND A METHOD OF REPAIRING A GAS TURBINE BLADE OR NOZZLE

DESCRIPTION OF THE INVENTION

1. Field of the Invention

The present invention related to a welding material composition, a welded structure using the material, a gas turbine blade, a nozzle, and a method of repairing a gas turbine blade or a nozzle.

2. Description of the Prior Art

In parts used in atmosphere over 1,000° C. or higher, alloys that are superior in high temperature strength are used. In recent years, gas turbine blades that are used in particularly severe atmosphere have been made of a unidirectional solidified Ni based alloy or a single crystal alloy. Further, an excellent cooling technology was developed so that temperatures of metal components are controlled on average, but there is a local portion where a metal temperature exceeds 1,000° C.

In order to prevent high temperature corrosion and oxidation, coating technique using MCrAlY, etc are applied to high temperature parts. However, if the metal temperature exceeds 1,000° C., anti-oxidation elements in the coating are exhausted to bring about reduction in thickness due to oxidation. Further, cracks due to thermal stress occur, that needs repairing the portions of oxidation thickness reduction and stress cracked portions to elongate the life of the hot temperature parts.

Since Ni based high strength super alloys that have been used for a gas turbine first stage blade are poor in welding properties, repairing welding was difficult. However, new welding techniques and welding materials were developed, and oxidation loss has been repaired by depositing weld metal. Welding methods are TIG welding which uses rod or wire welding material and PTA (plasma transfer arc) welding which uses powder welding material. In TIG welding, welding material must be formed into wire or rod; therefore, the welding material must be able to be hot worked or cold worked. Since temperature at the welding site is extremely high, it is very difficult to provide welding material that has consistent properties between hot working property and high temperature strength.

Welding materials for repairing parts of oxidation loss should have oxidation resistance property. Al that is useful for high temperature oxidation resistance stabilizes $Ni_3Al$ that is a strengthening phase for Ni based super alloy. When an amount of the precipitate $Ni_3Al$ is large, cold working property of the welding material is lost so that cold working property and oxidation resistance cannot be consistent.

In PTA welding that uses powder material, since the powder can be prepared by vacuum atomizing method etc, which does not need mechanical working, material selection can be made without considering working properties. However, in case of powder that has a large surface area, an amount of oxygen introduced into the welding material at the time of powder preparation and welding is larger than that of TIG welding, so that oxidation cracks at grain boundaries occur more easily. The oxidation cracks are the problem in case of TIG welding material, too.

As has been discussed, the conventional welding technique and welding materials are not satisfactory in the life after depositing welding. Thus, development of a welded structure having a longer life for oxidation loss is needed.

In Japanese Patent Laid-open 06-212325 (1994), there are disclosed nickel-cobalt alloys having a high heat-stability and high microstructure-stability at high temperature. The content disclosed in this publication is concerned with parts such as bolts, nuts, rivets, pins, collars, etc for turbine engines. These parts are mainly manufactured by cold working. This publication does not teach the use of the alloys as welding material.

In Japanese Patent Laid-open 2001-123237 discloses repairing of gas turbine blades by welding. Alloys disclosed in this publication are nickel based super alloys and comprise Cr18 to 22% by weight, Al0.5 to 1.3% by weight, W13 to 17% by weight, and other elements.

In Japanese Patent Laid-open 2001-158929 discloses welding technique and welded structure similar to those disclosed in Japanese Patent Laid-open 2001-123237, but the upper limit of cobalt is 10% by weight and the upper limit of aluminum is 0.7% by weight.

Summary of the Invention:

An object of the present invention is to provide welding material for manufacturing heat resistant parts and welded structure that are used at a temperature above 1,000° C., thereby to elongate life of the high temperature parts used in oxidation loss atmosphere.

DETAILED DESCRIPTION OF THE INVENTION

Figure 1:
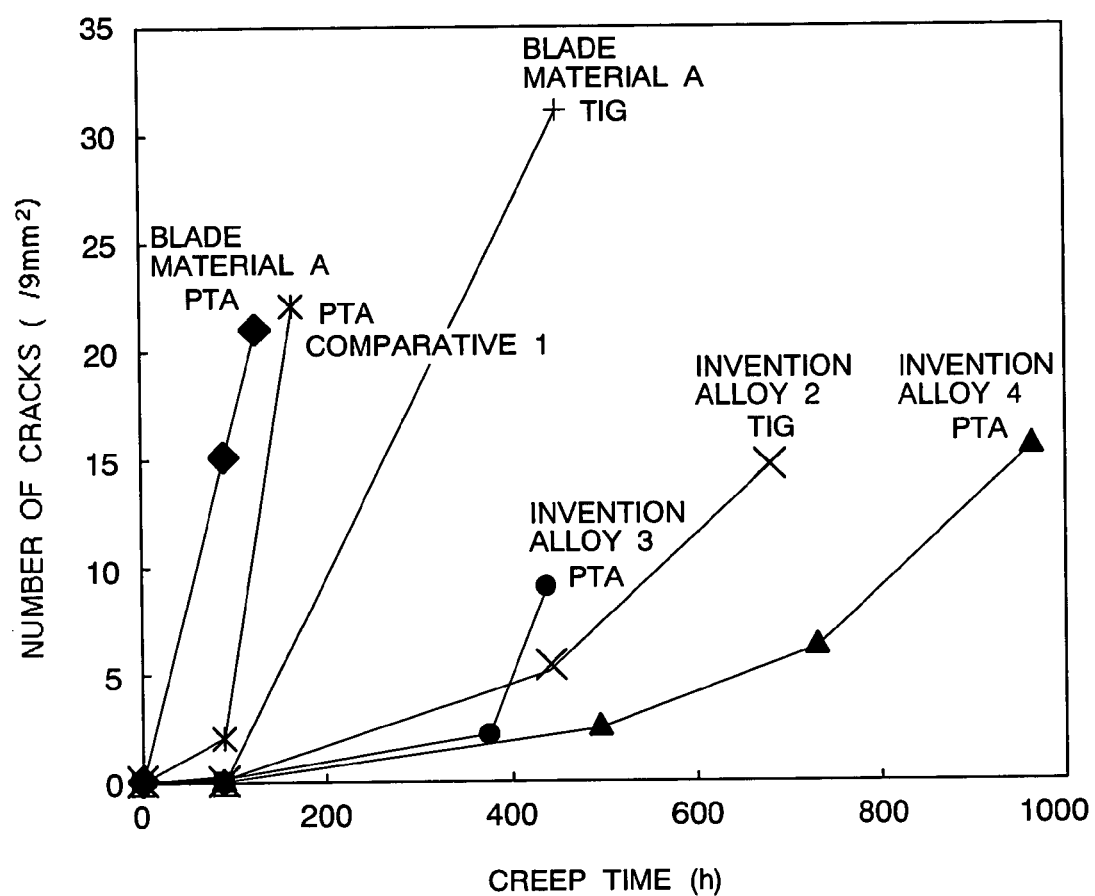
FIG. 1 is a graph showing measurement results of crack density concerning invention alloys and comparative alloys.

The inventors have conducted improvement of Ni based welding alloys with a view to suppress grain boundary oxidation cracks that occur when a stress is applied at high temperatures above 1,000° C. As a result, the elongation of life of the welded structure was achieved.

In order to prevent oxidation grain boundary cracks, it is essential to make the grain boundary inactive to cracks, as well as to increase oxidation resistance of alloys.

In the present invention increased was an amount of Co so as to suppress grain boundary oxidation cracks. In case of powder welding material, an amount of Al was increased, while an amount of W was relatively lowered. In case of wire welding material, an amount of Al was relatively lowered, while an amount of W was increased.

According to an aspect of the present invention, there is provided a welding material which comprises 18 to 25% by weight of Co, 15 to 20% by weight of Cr, 1.5 to 5.5% by weight of Al, 5.0 to 14.0% by weight of W, 0.05 to 0.15% by weight of C, the balance being Ni and usual impurities, wherein amounts of Co, Al and W are controlled to predetermined ranges.

DETAILED DESCRIPTION OF PREFERRED EMBODIMENTS

The constitution parts to which the present invention is applied are of thermal power plants and chemical plants that are subjected to high temperatures above 1,000° C. The present invention relates to elongate life of parts by deposit welding for repairing or prevention on parts that may cause oxidation loss or cracks so that progress of oxidation and cracks is suppressed.

The present invention is particularly effective to apply high temperature parts of gas turbine for industrial use, such as gas turbine blades, nozzles (static blades), etc. Especially, life of blades and nozzles is remarkably elongated by forming anti-oxidation loss layer on portions where there is oxidation loss or oxidation loss is foreseen. That is, repair welding and machining on the portion having oxidation loss are applied or deposit welding and machining on the portion are applied in advance.

According to one aspect of the present invention, there is provided a welding material composition, which is a nickel based super alloy having $\gamma'$ phase and chromium carbides that are precipitated and comprising 18 to 25% by weight of Co, 15 to 20% by weight of Cr, 1.5 to 5.5% by weight of Al, 5 to 14% by weight of W, 0.05 to 0.15% by weight of C, 0 to 0.02% by weight of B, 0 to 1% by weight of at least one of Ta, Nb, Ti, Mo, Re and Fe, 0 to 0.5% by weight of at least one of V, Zr, rare earth elements and Y, 0 to 1% by weight of Mn, 0 to 0.5% by weight of Si, and the balance being Ni, wherein there are co-relations between the amounts of % by weight of Al, W and Co as follows:

$$(GP \times 0.139 + 11) < [W] < (GP \times 0.139 + 16),$$

where $$GP = (90[Al] - 5[Co]).$$

W is an element effective for strengthening as solid solution at high temperatures; if its amount is too large, $\sigma$ phase deposits that is a harmful phase. When the $\gamma'$ phase deposits, Cr that stabilizes $\sigma$ phase is excluded from the $\gamma'$ phase into mother phase, so that deposition of $\sigma$ phase may become easy.

Accordingly, if an amount of deposition of the $\gamma'$ phase is large, it is necessary to lessen an amount of W that is an element for solid solution strengthening. An amount of deposition of the $\gamma'$ phase is largely affected by Al and Co in the alloy series of the present invention, and solid solution temperature which is a criteria for an amount of the $\gamma'$ phase deposition may be expressed by the following equation.

$$[\text{Solid solution temperature of } \gamma' \text{ phase}] = 690 + (90[Al] - 5[Co])/°C.,$$

where

[Al] and [Co] are % by weight of Al and Co.

In the present invention, the upper limit of W addition was investigated as a parameter GP. When an amount of W addition is too small, strength of alloys remarkably lowers. Thus, an amount of W is determined as follows so that welded structure having an effective strength is obtained.

Figure 6:
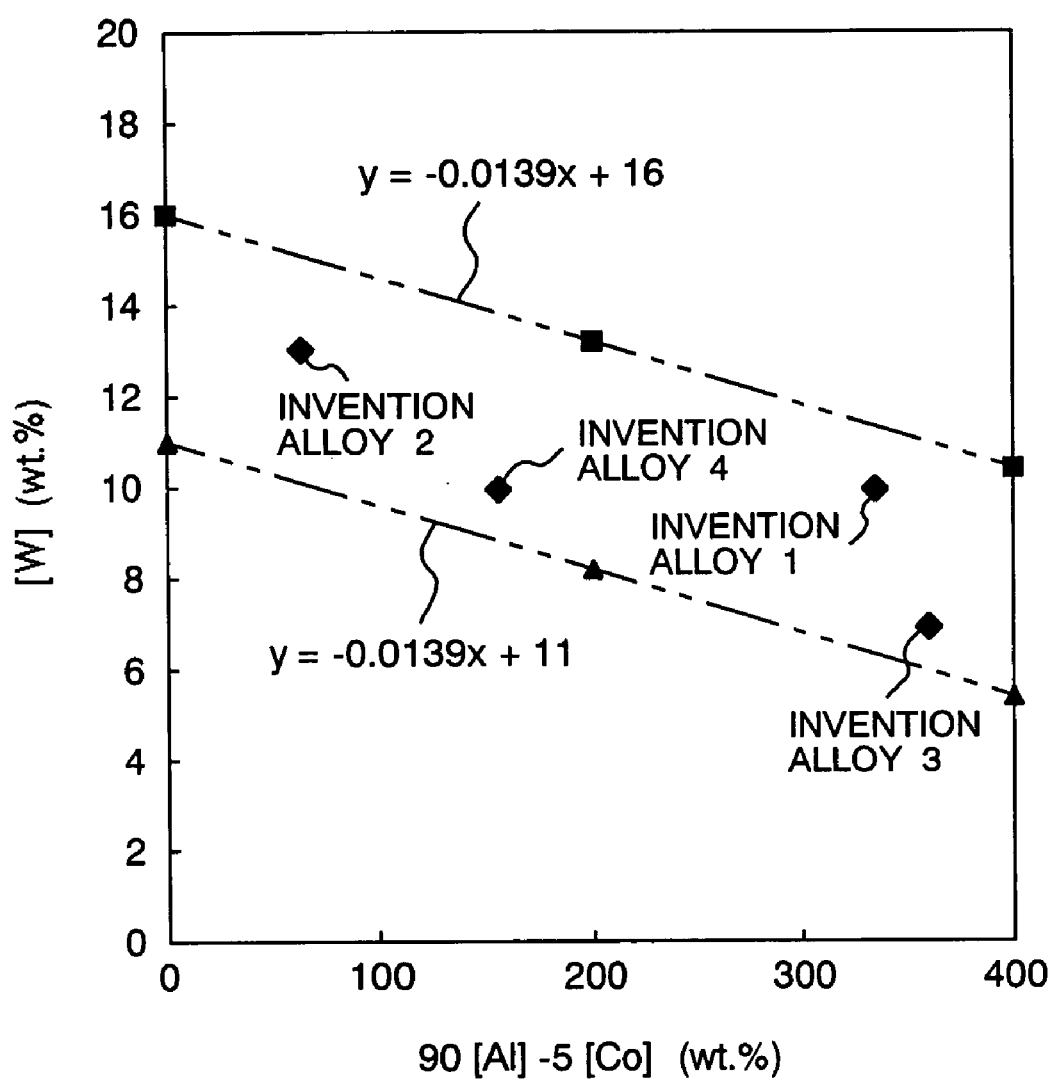
FIG. 6 is a graph showing relationship among W, Al and Co of the invention alloys.

The welding material is a Ni based super alloy having deposited $\gamma'$ phase, and there is the following relationship between amounts of Al, W and Co % by weight. This is shown in FIG. 6.

$$(GP \times 0.139 + 11) < [W] < (GP \times 0.139 + 16)$$

Rare earth elements are added as misch metal, La or Ce in singular form or mixed form. When the welding material is powder form, the composition is 18 to 19% by weight of Co, 4.5 to 5.5% by weight of Al, 17to 19% by weight of Cr, 6 to 8% by weight of W, 0.005 to 0.015% by weight of B, 0.05 to 0.15% by weight of C, other necessary elements and the balance being Ni. The alloy powder has a mean particle size of 80 to 170 μm.

According to the present invention, a welded structure is provided using the above-described welding material, which is deposited on a mother metal. An example of particularly useful applications is gas turbine blades or gas turbine nozzles the tips of which are welded with the welding materials. Further, there is provided a method of repairing gas turbine blades or nozzles by welding the above described welding material to tip portions thereof, followed by necessary machining to form them into a desired shape.

Gas turbine blades or nozzles are manufactured by precision casting of high strength the $\gamma'$ phase strengthened alloy. Since cooling speeds at the time of solidifying of precision casting or unidirectional casting is slow, sedimentation occurs at boundaries of dendrite or grain boundaries. Ti is a typical sedimentation element in super alloys. Since Ti is an element that stabilizes the $\gamma'$ phase or MC carbides, MC carbides and the $\gamma'$ phase are formed more at the dendrite boundaries and grain boundaries. These sediments make itself pins at grain boundaries to prevent movement of grain boundaries so that tree like structure (dendrite) that is formed at solidification is maintained even at high temperature.

In deposition welding to high strength $\gamma'$ phase strengthened alloys, welding heat must be made small so as to prevent welding crocks. As a result, solidification speed of welding metal is fast and solidification sediments are hardly formed, compared to precision casting materials. Thus, MC carbides present at grain boundaries are little, and when it is subjected to high temperatures, grain boundaries tend to move so that smooth grain boundaries may be formed.

Cracks along the smooth grain boundaries proceed more easily, compared to uneven surface or rough surface grain boundaries of dendrite. MC carbides precipitate homogeneously in grains when there is no sedimentation, but in case of $Cr_{23}C_6$ type carbide, which is a typical carbide of super alloys, it has characteristics to precipitate at grain boundaries even when there is no sedimentation.

However, since a large amount of Ti is added in case of high strength $\gamma'$ phase strengthened type alloys, MC carbides become stable at temperatures above 1,000° C. so that $Cr_{23}C_6$ carbides are not precipitated at grain boundaries.

Although $\gamma'$ phase is an effective strengthening phase to improve high temperature strength, a grain size of the precipitate becomes large due to Ostwalt growth at a temperature above 1,000° C. so that ability of precipitation strengthening remarkably decreases.

As long as the portions where the temperature is elevated to 1,000° C., solid solution strengthening by W or Mo is better than precipitation strengthening by the $\gamma'$ phase. Since the $\gamma'$ phase contains a lot of Al, Al becomes short in the mother phase when the $\gamma'$ phase precipitates. Thus, it is better that the $\gamma'$ phase does not precipitates in view of anti-oxidation.

When an additive amount of Ti is 0.5% by weight or less, $Cr_{23}C_6$ type carbide whose main component is Cr can be made stabilized at temperatures over 1,000° C. In order to achieve this, it is necessary to add Cr and C in amounts of 15 to 20 and 0.05 to 0.15% by weight, respectively. An excess addition of Cr causes a harmful a phase, and an excess addition of C lowers ductility due to increase in carbides.

In the alloys of the present invention, when the welding material is powder, main components are Ni, Co, Cr, Al, W and C. An amount of Al is 3.5% by weight or more and solid solution temperature of the γ' phase is 1050° C. or higher. (That is, since the γ' phase dissolves in the matrix, anti-crack property is extremely high.) $Cr_{23}C_6$ carbide can be present stably at temperature above 1,050° C. But, at temperatures sufficiently lower than 1,050° C, e.g. room temperature, the welding metal has a phase where the γ' phase precipitates.

When the welding material is wire form, main components are Ni, Co, Cr, Al, W and C. An amount of Al is 1.5% by weight or more, and the γ' phase solid solution temperature is 900° C. or lower. Thus, the structure is that $Cr_{23}C_6$ carbide can be present stably at temperatures above 1,050° C.

There are W, Re, Ta Nb and Mo as typical solid solution strengthening elements; Mo forms volatile oxide film to impart adverse affect on high temperature anti-oxidation, and thus W should preferably be chosen as the solid solution strengthening element.

Refractory elements such as Mo, Re, Nb, Ta, etc should be 1% by weight or less. If W is added excessively, harmful a phase may precipitate. Therefore, a preferable amount of W is 5 to 14% by weight.

It is necessary to increase an amount of Al so as to improve anti-oxidation property. It is preferable that the γ' phase is not present at an operating temperature, i.e. 1,000° C. Therefore, the γ' phase may be present at low temperatures, but the γ' phase should be dissolved into the matrix at such high temperatures. Further, the γ' phase that is detrimental to cold working is not desirable to make welding rods for TIG welding. Thus, its precipitation temperature should be controlled to be about 950° C. or lower.

From the above reasons, the precipitation temperature of the γ' phase should be lowered, while an amount of Al is increased, and small amounts of Ta, Nb and Ti that make the γ' phase stabilize are preferable.

On the other hand, addition of elements that make the γ' phase unstable at high temperatures are effective. Especially, addition of Co makes it possible to lower the precipitation temperature of the γ' phase and to increase an amount of Al.

If an excess amount of Co is added, the σ phase precipitates; thus 18 to 25% by weight of Co is preferable. As the result of increase of Co, Al can be added in an amount of 4.5 to 5.5% by weight in case of powder, and in case of TIG wire, 2 to 3% by weight of Al can be added. In view of working cost, an additive amount of Al should be 2 to 5.5% by weight.

According to the compositions described above, anti-oxidation is improved to suppress grain boundary cracks, as well as to suppress smoothing of the grain boundaries by precipitation of carbides. In the above compositions, Al and W are added in amounts of 4.5 to 5.5 and 6 to 8% by weight, respectively, in case of powder material. When Al and W are added in amounts of 1.5 to 3 and 8 to 14% by weight, respectively, TIG welding materials that are productivity and high temperature properties can be provided.

There is Japanese Patent Laid-open 2001-158929 as prior art disclosing solid solution strengthening type alloys. In this prior art, an amount of Al is small. In the present invention, an amount of Co is large, which makes it possible to increase an amount of Al, thereby to improve anti-oxidation.

The above-described invention is based upon an idea that Cr23C6 carbide is precipitated at grain boundaries to prevent smoothening of grain boundaries and to improve anti-oxidation.

The inventors of the present invention have investigated a method of preventing the smoothening of grain boundaries by employing η phase, which is known as detrimental phase for Ni based alloys. The η phase has a composition similar to that of the γ' phase. When the η phase precipitates to decrease the γ' phase which is a strengthening phase, strength of welded portion is lowered.

While the η phase is considered as a detrimental phase, there is not a fatal detriment at high temperature, because the γ' phase has little capability of strengthening. Further, as a result of experiments, the inventors of the present invention have discovered that since the η phase precipitates in a lamellar form from the grain boundaries as the starting point, the grain boundaries are made uneven surface or zigzag, so that the lamellar structure becomes obstacles to crack progress to suppress progress of grain boundary cracks.

In order to stably precipitate the η phase, it is necessary to add relatively large amounts of Ti and Ta. Since Al stabilizes the γ' phase to lessen the precipitate of the η phase, it is not possible to add a large amount of Al. In order to precipitate the η phase, an amount of Al cannot be increased, and an amount of Ti cannot be decreased. Therefore, anti-oxidation of this alloy cannot reach that of $Cr_{23}C_6$ precipitation alloys. But, application of this alloy to portions where stress cracks tend to occur, while oxidation loss is little because anti-crack property is superior.

In the present invention, it is very important to select relationship among amounts of Co, Al and W. If the relationship is not proper, welding material will be broken or cracks occur at welding temperature. In some cases, manufacturing of wire may be impossible or very difficult.

In the present invention, the relationship among Co, Al and W is selected as falling within the equations mentioned above. In the Japanese Patent Laid-open 2001-212325, there is disclosed cold working Ni based alloys containing 20 to 35% by weight of Co, 0 to 5% by weight of Al, 0 to 6% by weight of W. But, actually disclosed compositions are (A) about 25% by weight of Co, about 1% by weight and about 2% by weight of W, and (B) about 30 to 35% by weight of Co, about 1% by weight of Al and about 2% by weight of W. Accordingly, the prior art does not disclose alloys that satisfy the relationship of the present invention.

The alloys of the present invention may contain usual impurities such as not larger than 0.1% by weight of copper, not larger than 0.02% by weight of phosphor, not larger than 0.02% by eight of sulfur, not larger than 0.03% by weight of nitrogen, and not larger than 0.02% by weight of oxygen.

The present invention will be explained in concretely as follows.

EXAMPLE 1

There are shown oxidation and creep test results of test pieces prepared from weld deposit metals which were obtained by welding materials on turbine blade material A. In Table 1, there are shown compositions of tested weld metals.

The weld metals were prepared by a vacuum gas atomizing method or a vacuum melting method, hot forging and cold drawing. The powder prepared by the vacuum gas atomizing method had a particle size of about 150 μm, the powder being applied to a plate by a powder PTA method.

The vacuum melting, hot forging and cold drawing material was wire having a diameter of 1.5 mm. The wire was welded on a plate by TIG welding method. The invention alloy 2 and invention alloy 4 were subjected to vacuum melting to obtain an ingot of 10 kg, and then it was hot worked to a 15 mm diameter rod; thereafter the rod was cold worked into wire of a diameter of about 1.5 mm.

Invention alloy 2 and invention alloy 4 had good hot-working property and cold working property. Since the blade material A was hard to be hot worked, a rod having a section of about 1.5 mm squares was cut from a precision casting ingot by a discharge working method.

In order to investigate anti-crack property under the superimposed effect of oxidation and stress, creep test was conducted at 1,050° C., at which oxidation takes place badly, and states of grain boundary cracks and rupture time of creep interrupted material and ruptured material were evaluated. In the tests, stress was 19.6 MPa.

FIG. 1 shows relationship between an interrupted time and crack density. Invention alloy 1, invention alloy 2 and invention alloy 3 exhibited crack density smaller than the PTA material of blade material A and than the TIG material of blade material A as well. Comparative examples in FIGS. 1, 2 and 3 do not mean prior art, but are alloys that are outside of the compositions of the present invention.

Figure 2:
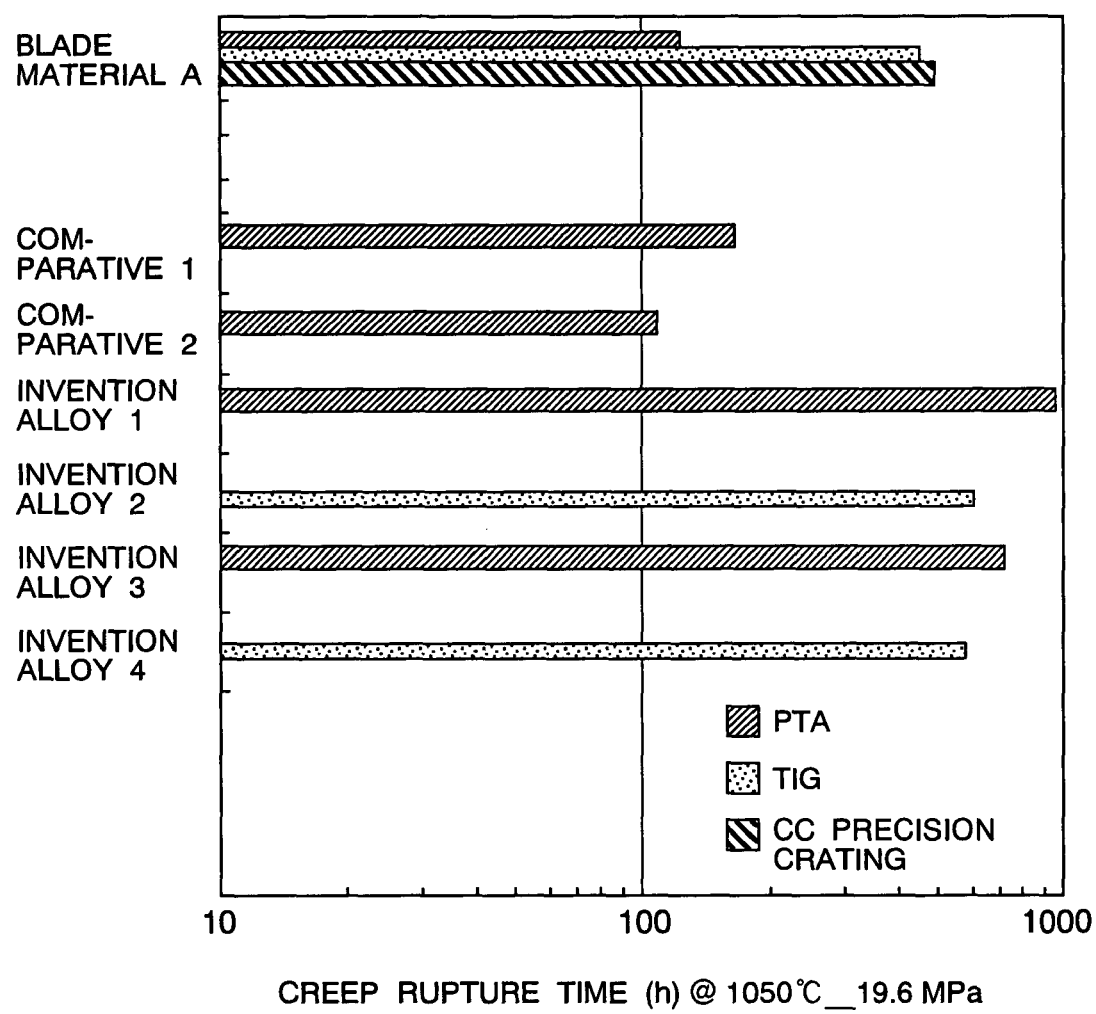
FIG. 2 is a graph showing test results of the creep rupture test concerning invention alloys and comparative alloys.

FIG. 2 shows creep rupture time of alloys. Invention alloy 1, invention alloy 2, invention alloy 3 and invention alloy 4 exhibit creep rupture time longer than that of PTA material of blade material A, and the same or longer than that of precision casting material of blade material A.

Figure 3:
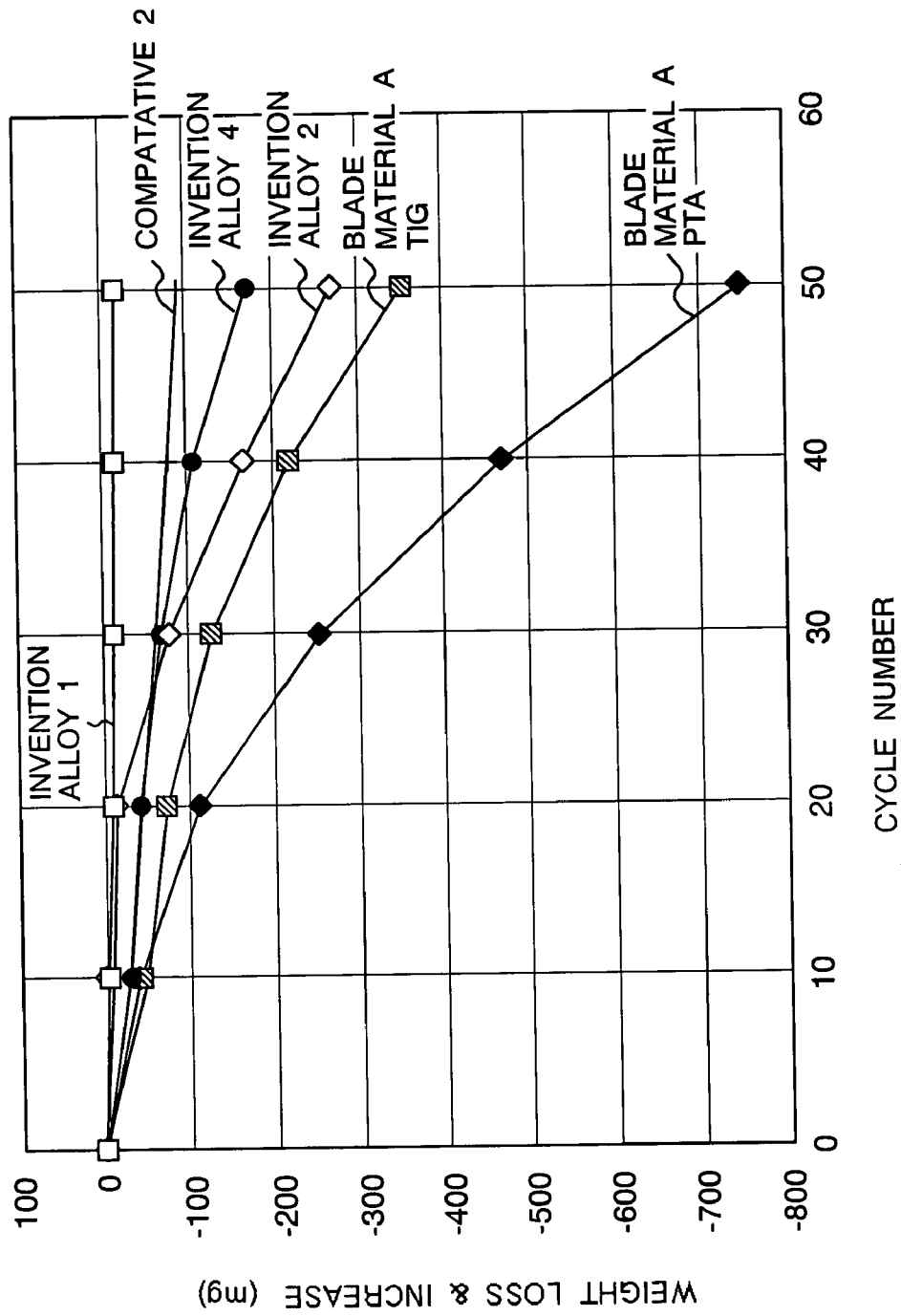
FIG. 3 is a graph showing test results of repetition oxidation test concerning invention alloys and comparative alloys.

FIG. 3 shows test results of anti-oxidation tests of the alloys. The anti-oxidation test is a repetition oxidation test, wherein keeping temperature and keeping time were 1,092° C. and 10 hours, respectively, and cooling temperature was 200° C. The initial surface area of the test piece was 150 mm2. Invention alloy 1, which was prepared by PTA welding exhibited almost no change of weight after the test of 50 cycles. The comparative alloy 2 that has a composition outside of that of the present invention contains 5% by weight of Al, which is the same as that of invention alloy 1, but it exhibited worse anti-oxidation property than invention alloy 1.

Invention alloys 2 and 4 that are easy to be hot worked and is able to make wire and rod materials for TIG welding exhibited anti-oxidation property better than TIG material of blade material A, which is hard to be cold worked. An additive amount of Al of the blade material A is 3% by weight, but invention alloy 2 containing 2% by weight of Al is superior to the blade material A containing 3% by weight of Al.

From the above results, invention alloys exhibited anti-oxidation and anti-crack properties better than those of the blade material A as mother material.

EXAMPLE 2

Figure 4A:
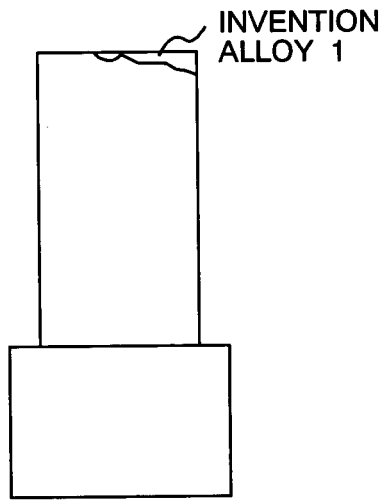
FIG. 4 is a side elevational view of a repaired gas turbine blade.
Figure 4B:
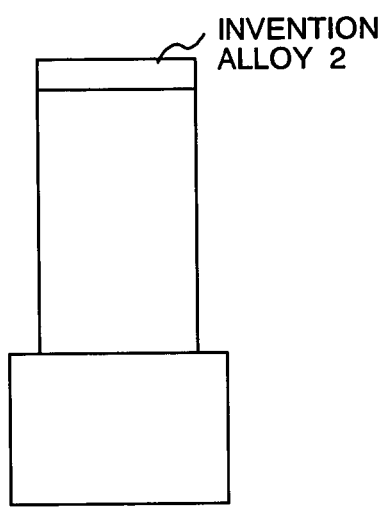

FIG. 4(a) shows a side elevational view of a gas turbine first stage blade (blade a) to which repairing welding of the invention alloy of Example 1 was applied, the blade having been used for 2,000 hours in the actual power plant. The invention alloy was applied by powder PTA method to crack occurred portion and oxidation loss portion. FIG. 4-(b) shows an example wherein welding of invention alloy was applied to a blade having a damaged state similar to the first stage blade.

The damaged tip of blade b was cut, and then TIG welding was applied thereto. Welding methods are disclosed in Japanese Patent Lai-open 2001-123237 and Japanese Patent Laid-open 2001-158929, the description of the welding in the publication being a part of the specification.

Figure 5:
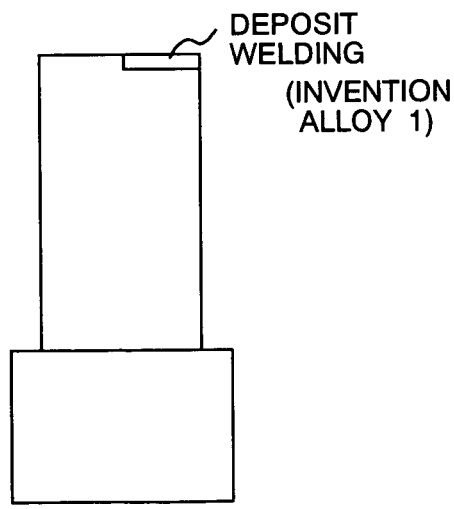
FIG. 5 is a side elevational view of a gas turbine blade to which an anti-oxidation deposit welding was applied.

FIG. 5 shows deposit welding on a portion that is easily subjected to oxidization loss. The portion was previously cut out from the unused blade c. The welding material was invention alloy 1, which is superior in anti-oxidation property.

Defects such as cracks was not detected in blades a to c by FPT inspection after deposit welding. In observation of the structure of the welding by slicing, fine cracks were not observed. Elongation of high temperature parts could be achieved by the use of the blades a to c.

Alloy compositions used in the examples are shown in Table 1.

TABLE 1

Alloy Composition (% by weight)

| Element | Comp. Ex. 1 | Comp. Ex. 2 | Invent. Alloy 1 | Invent. Alloy 2 | Invent. Alloy 3 | Invent. Alloy 4 | Blade Material |
|---------|-------------|-------------|-----------------|-----------------|-----------------|-----------------|----------------|
| Ni | Bal. | Bal. | Bal. | Bal. | Bal. | Bal. | Bal. |
| Al | 3.0 | 5.0 | 5.0 | 2.0 | 5.0 | 2.0 | 3.0 |
| Co | 9.5 | 9.5 | 18.0 | 23.0 | 23.0 | 23.0 | 9.5 |
| Cr | 18.0 | 18.0 | 18.0 | 18.0 | 15.0 | 18.0 | 14.0 |
| Mo | 5.0 | 2.0 | 0 | 0 | 0 | 0 | 1.6 |
| Ta | 2.0 | 2.0 | 0 | 0 | 0 | 0 | 3.0 |
| Ti | 0 | 0 | 0 | 0 | 0 | 0 | 5.0 |
| W | 4.0 | 4.0 | 7.0 | 13.0 | 10.0 | 10.0 | 4.0 |
| B | 0.012 | 0.012 | 0.012 | 0.012 | 0.012 | 0.012 | 0.012 |
| C | 0.10 | 0.10 | 0.10 | 0.10 | 0.10 | 0.10 | 0.10 |

According to the present invention, it was possible to repair oxidation loss and cracks that occurred in the operation of an actual plant; since the repaired welding metal exhibits, elongation of life of parts could be possible. It was also possible to prevent oxidation loss by applying welding of the alloys of the present invention in advance to portions where oxidation loss is foreseen.

What is claimed is:

1. A method of repairing a gas turbine blade or a nozzle, which comprises welding a welding wire having a composition having gamma prime phase and precipitated chromium carbides comprising 18 to 25% by weight of Co, 15 to 20% by weight of Cr, 1.5 to 5.5% by weight of Al, 5 to 14% by weight of W, 0.05 to 0.15% by weight of C, 0 to 0.02% by weight of B, 0 to 1% by weight of at least one member of Ta, Nb, , Mo, Re and Fe, 0 to 0.5% by weight of Ti, 0 to 0.5% by weight of at least one member of V, Zr, rare earth elements and Y, 0 to 1% by weight of Mn, 0 to 0.5% by weight of Si, and the balance being Ni to the tip of the blade or nozzle, and shaping the welded portion in a desired form.

2. The method of repairing a gas turbine blade or a nozzle according to claim 1, wherein the alloy is made from a powder material having a particle size of from 80 to 170 micrometers and has a composition comprising 18 to 19% by weight of Co, 4.5 to 5.5% by weight of Al, 17 to 19% by weight of Cr, 6 to 8% by weight of W, 0.005 to 0.02% by weight of B, 0.05 to 0.15% by weight of C.

3. The method of repairing of gas turbine blade or a nozzle according to claim 1, wherein the alloy is made from a wire having a composition comprising 18 to 19% by weight of Co, 4.5 to 5.5% by weight of Al, 17 to 19% by weight of Cr, 6 to 8% by weight of W, 0.05 to 0.15% by weight of C, and 0.005 to 0.02% by B.

4. A method of repairing a gas turbine blade or a nozzle, which comprises welding a welding wire having gamma prime phase and precipitated chromium carbides and having a composition comprising 18 to 25% by weight of Co, 15 to 20% by weight of Cr, 1.5 to 5.5% by weight of Al, 5 to 14% by weight of W, 0.05 to 0.15% by weight of C, 0 to 0.02% by weight of B, 0 to 1% by weight of at least one member of Ta, Nb, Mo, Re and Fe, zero % of Ti, 0 to 0.5% by weight of at least one member of V, Zr, rare earth elements and Y, 0 to 1% by weight of Mn, 0 to 0.5% by weight of Si, and the balance being Ni to the tip of the blade or nozzle, and shaping the welded portion in a desired form.

* * * * *